May 12, 1936.  M. A. WEYLAND  2,040,192
CONTROL MECHANISM FOR AUTOMOBILES
Filed Aug. 8, 1934
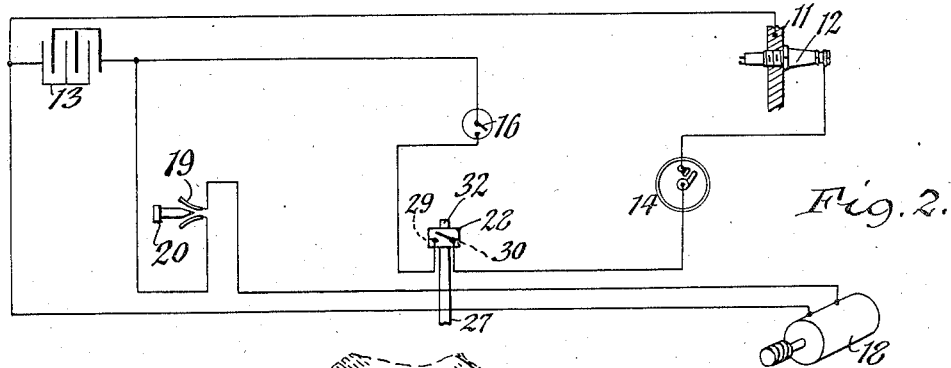
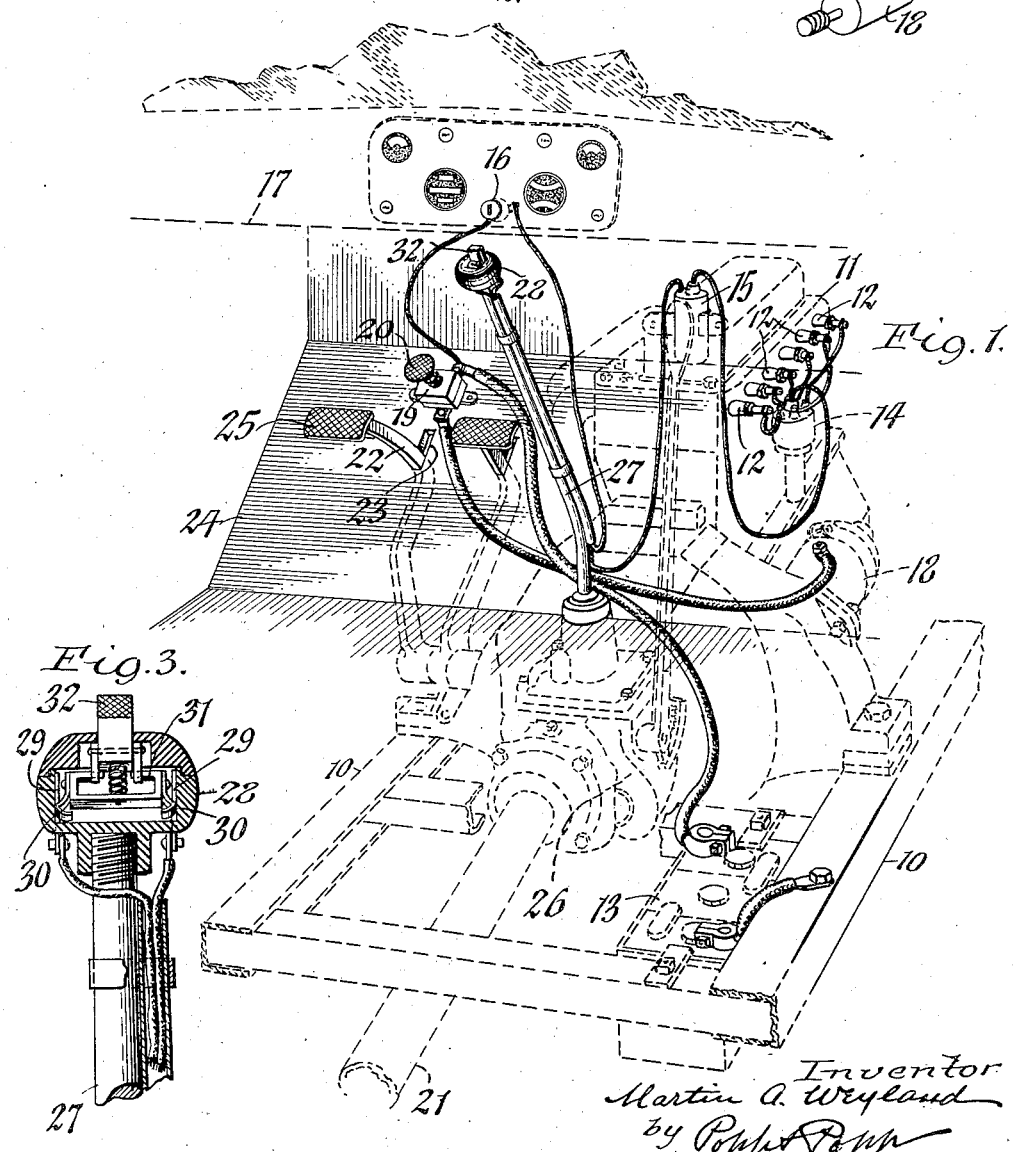
Inventor
Martin A. Weyland
by Popp & Popp
Attorneys Patented May 12, 1936

2,040,192

UNITED STATES PATENT OFFICE 2,040,192

CONTROL MECHANISM FOR AUTOMOBILES

Martin A. Weyland, Buffalo, N. Y.

Application August 8, 1934, Serial No. 739,054

1 Claim. (Cl. 123—179)

This invention relates to a mechanism for controlling the operation of automobiles, the propelling power of which is derived from the explosions of fuel in an internal combustion engine.

As is well-known, automobiles of this character have the internal combustion engine mounted on the chassis and the mechanism for transmitting power from the engine to the propelling wheels of the running gear includes a clutch whereby the engine may be coupled with and uncoupled from the propelling wheels, and also a change speed mechanism whereby the motion of the engine may be transmitted to the propelling wheels at unvarying speeds. This clutch mechanism is usually operated by means of a foot lever or clutch pedal which is adapted to be actuated by one foot of the operator so that upon moving this pedal forwardly the clutch will be released or uncoupled for the purpose of declutching the engine from the propelling wheels, while upon releasing this pedal and permitting the same to move backwardly the clutch will be permitted to operatively connect the engine with the propelling wheels of the automobile.

Starting of the engine has usually been accomplished by an electrically operated starting motor, the circuit of which includes an electric battery, preferably the storage type, which circuit also includes a starting switch adapted to be operated by the foot of the operator for the purpose of temporarily closing the circuit of the starting motor for a sufficient length of time to set the main internal combustion engine in operation, after which the release of the starting switch will arrest the operation of the starting motor while the main or propelling engine continues to work.

In addition to this the means for igniting the combustible fuel in the engine include one or more spark plugs arranged in one or more cylinders of the engine, depending upon whether it is a single or multi-cylinder engine, and the circuit which includes these spark plugs, the electric source such as a storage battery, and the distributor for selectively sending the current in the proper order through the spark plugs also includes a master or main switch which is usually arranged on the instrument board or dash board of the automobile, this master switch being usually operated by means of a key so that the same can be locked against tampering by unauthorized persons and only enable the person having the proper key to close the main ignition system switch for operating the automobile propelling engine.

In the automobiles as heretofore constructed, these various elements have been so organized that the circuit of the ignition system was capable of being closed and opened only by the main or master switch on the instrument board and the starting switch was generally placed on the floor or foot-board of the automobile at a place remote from the clutch pedal so that the starting switch had to be operated by the right foot and the clutch pedal had to be operated by the left foot.

It has been found in practice that this organization necessitated keeping the propelling engine in operation when the automobile was either slowed down or brought to a stand-still at a street crossing where cautionary signs are displayed, or where traffic signals are established indicating when an automobile was free to cross or was held up for a time for the purpose of insuring safety at such crossings. The idle operation of an engine driven by an explosive fuel such as gasoline, involves an unnecessary waste of fuel not only while stopping at a street crossing or intersection but also while slowing down when approaching a stop signal or cautionary signal at a reduced speed with the object of keeping the engine going slowly in expectation that the signal will change by the time the automobile reaches the signal.

It is the object of this invention to combine with the ignition system of the gasoline-operated engine an auxiliary switch whereby the circuit of the ignition system may be conveniently opened and closed independently of the main or master switch when it is desired to temporarily stop the operation of the engine either while coasting toward a street crossing or intersection which is protected by a traffic signal of some kind, and also to so arrange the starting switch relative to the clutch pedal that the operation of the starting motor can be effected easily, conveniently and quickly by the same foot which operates the clutch for temporarily disconnecting the engine from the automobile propelling mechanism, and thereby temporarily arresting the operation of the engine, but permitting the starter to be easily operated for restoring the operation of the engine for resuming propulsion of the automobile, particularly commercial trucks, thereby avoiding unnecessary operation of the propelling engine under power when this is not required, and effecting a substantial saving in the consumption of gasoline.

In the accompanying drawing:—

Figure 1 is a fragmentary perspective view of an automobile having its internal combustion engine, ignition system, change speed gearing and clutch mechanism equipped with my improvement.

Figure 2 is a wiring diagram showing the manner in which the electric circuits are organized in connection with the several parts of an automobile in accordance with my invention.

Figure 3 is a fragmentary vertical section, on an enlarged scale, showing one form of auxiliary switch which may be used on the gear shift lever as part of my invention.

In the following description similar characters of reference indicate like parts in the several figures of the drawing.

Referring to the drawing, the numeral 10 represents the main frame of the chassis of an automobile of the type now well-known and in general use, which frame is provided with the usual wheels, some of which are more particularly intended for driving wheels whereby the automobile is propelled over a roadway, while other wheels are more particularly organized for steering the vehicle over the ground. Inasmuch as these parts are of any suitable construction, no detailed description or illustration of the same is deemed necessary.

The numeral 11 represents the main propelling engine of the automobile which is usually mounted on the front end of the main frame, and in the present case is of the internal combustion type which is operated by the explosion of a combustible fuel and generally referred to as a gas engine. Such engines may be provided either with a single power cylinder or a multiplicity of such cylinders, but in Fig. 1 of the drawing an engine is shown in which six power cylinders are employed and each of these cylinders is provided with a spark plug 12 which forms part of the ignition system whereby electric sparks are produced successively in the several cylinders, so that the pistons in these cylinders are operated in the proper order for rotating the crank shaft of this engine.

The electric current for producing the sparks successively at the terminals of the respective plugs within the power cylinder may be derived from an electric source of any suitable character, for example from a storage battery 13 which is mounted on the main frame of the chassis and is usually charged by a generator which is driven by suitable gearing from the shaft of the main propelling engine 11 in a manner which is well-known in this art.

When the propelling engine contains more than one power cylinder, a distributor 14 of well-known construction is employed which operates to send the current from the battery 13 successively through the several spark plugs in properly timed relation with the movement of the pistons in the respective cylinders, and a condenser 15 of well-known construction is also connected in circuit with these spark plugs.

Ordinarily the circuit of the main ignition system of the propelling engine is controlled by means of a main or master switch 16 which is preferably operated by means of a key, so that no one is able to close or open this circuit excepting a person possessing the right kind of key, and thereby avoids or at least reduces the possibility of anyone using or operating the automobile without authority. Although this master switch may be located on any suitable part of the automobile chassis, it is a common practice to mount the same on the instrument board or dash board 17 as in the present case, where the same is within convenient reach of the operator while the latter occupies the front seat of the car.

Starting of the propelling engine is effected in the present case by means of a starting motor 18 which is adapted to connect with the propelling engine in any suitable and well-known manner now commonly used in automobile engines and which is connected with an electric circuit containing the battery 13 and also a starting switch 19, which latter is preferably so organized that the same is operated by foot pressure of the operator.

Upon pressing on the button 20 of this starting switch by one foot the starting circuit which includes the battery 13 and motor 18 is closed, whereby the starting motor is energized and the latter in turn actuates the propelling motor and turns the shaft of the latter a sufficient number of times to cause the same to run on its own account, after which a release of the foot pressure on the starting button 20 will cause the starting switch to be again opened in the usual and well-known manner.

The coupling and uncoupling of the shaft of the engine with the driving shaft 21 of the automobile running gear leading to the propelling wheels of the automobile is controlled by means of a clutch of any suitable construction which is controlled by means of a clutch lever or arm 22 projecting from the clutch upwardly through a slot 23 in the foot board or floor board 24 of the chassis. Upon stepping by means of the foot on the pedal 25 of this clutch lever and moving the same forwardly and downwardly, the clutch will be released or uncoupled so as to declutch the propelling engine from the mechanism whereby power is transmitted to the propelling wheels of the car, while upon releasing the pressure on this clutch pedal, the latter will be moved backwardly under spring pressure and permit the clutch to close or couple the propelling engine with the propelling wheels of the car through the medium of the transmission mechanism, and thereby cause the car to move over the roadway.

The speed at which the motion of the engine shaft is transmitted to the longitudinal shaft 21 of the power transmitting mechanism may be varied through the medium of a change speed mechanism, a conventional form of which is indicated at 26 in Fig. 1. The shifting of this change speed mechanism to obtain the desired speed and direction of movement of a car is effected in the present case by means of an upright gear shift lever 27 which extends upwardly from the change speed gearing 26 through the floor board of the car and terminates at its upper end in a knob or handle 28 which is within convenient reach of the operator while occupying the front seat of the car.

On this gear shift lever and preferably on the handle or knob 28 thereof is mounted an auxiliary switch whereby the circuit of the ignition system may be opened and closed independently of the operation of the master switch 16 which is mounted on the instrument board, and this operation of the auxiliary ignition switch may also be effected by one and the same hand which is engaged in the act of moving the gear shift lever for changing the speed gearing for causing the car to be propelled forwardly at either one speed or another by motion derived from the engine, or to be propelled backwardly, or for disconnecting the engine from the propelling wheels by placing this change speed mechanism in neutral. The auxiliary switch may be of any suitable construction but it is preferable to employ for this purpose a snap switch having two stationary contacts 29 mounted on the handle 28 and two movable contacts 30 which are adapted to be engaged with and disengaged from the stationary contacts 29 by means of a bridge piece or carrier 31 connected with these movable contacts and adapted to be shifted into and out of their operative position by means of a finger piece 32 connected with the bridge piece 31 and projecting upwardly through the opening in the top to the knob or handle 28, as best shown in Fig. 3.

Although the button 20 of the starting switch may be arranged on any suitable part of the floor board or foot board, for present purposes it is preferably arranged on the foot board longitudinally in line with and immediately in front of the pedal of the clutch lever, as shown in Fig. 1, so that by forward pressure of one foot of the operator against the clutch pedal the clutch may be disengaged for declutching the engine from the propelling wheels and then by a further movement of the clutch lever or pedal the toe of the same foot of the operator will be engaged with the starting switch 19 of the circuit which includes the starting motor, and thereby cause the latter to operate the propelling engine while the latter is declutched from the propelling wheels. By this means the clutch may be either coupled or uncoupled independently of the operation of the starting switch, and it is also possible to operate the starting switch by the same forward movement of the foot which disengages the clutch, so that these two operations are practically effected simultaneously instead of requiring two separate movements or the use of two separate feet for accomplishing this purpose, as has been the custom heretofore.

In the operation of an automobile equipped with my improvement, the procedure is preferably as follows:—

When the automobile is not in operation and the propelling engine is at rest the ignition circuit is open at the master switch 16 and is also preferably open during this time at the auxiliary switch 29, 30, 31, the starting switch 19 controlling the starting motor 18 is open, the clutch pedal or lever is in its rearward position in which the driving clutch is coupled, and the gear shift lever 27 is preferably in its neutral position.

If it is now desired to propel the car, it is preferable to follow, as far as possible, the practice heretofore commonly used in starting a car which consists in first pushing the clutch pedal forwardly so as to disengage the main driving clutch and then turning the master switch by means of a key so as to close the ignition circuit at this point. After this the operator may grasp the gear shift lever and close the auxiliary switch of the ignition circuit thereon and at the same time shift this lever into any position required for bringing into play the desired relation of the change speed mechanism, depending upon whether the car is to be moved forwardly or backwardly, and also at what particular speed. After the desired selection of gearing in the change speed mechanism has been effected, the operator by continuing the forward pressure of one foot on the clutch pedal after disengaging the clutch, engages the toe portion of this foot with the button 20 of the starting switch, thereby closing the circuit through the elecric starting motor 18 and causing the shaft of the propelling engine to be turned and the parts associated therewith to be moved to the required extent for causing the propelling engine to continue operation on its own account due to the operation of the ignition system, of which the circuit has been previously closed at the main switch on the instrument board and also the auxiliary switch on the gear shift lever.

After the propelling engine has been started in this manner, the clutch lever or pedal is released so as to permit the clutch to couple the propelling engine with the driving means or propelling means of the car, which include the driving wheels of the same, whereby the car will be propelled in accordance with the position in which the change speed mechanism has been set.

It is, of course, possible to start the car in this manner while the gear shift lever is still in a neutral position and then throw out the clutch temporarily to permit of selecting the desired gearing of the change speed mechanism, and it is also permissible to close the auxiliary switch and the starting switch at the same time.

Assuming that now the driver of the automobile observes a signal ahead which requires him to stop at a given location, and finds that the momentum of the car will carry him up to this signal or within a satisfactory distance therefrom, then the driver may throw out the clutch for disconnecting the engine from the propelling means and at the same time move the gear shift lever into a neutral position by one hand and also utilize this same hand for operating the auxiliary switch on the gear shift lever for opening the circuit of the ignition system and thus stop the engine. The instant the road ahead is again clear or the signal to proceed is given, the driver of the car can quickly throw out the clutch and close the starting switch by the pressure of one foot and simultaneously with one hand close the auxiliary ignition system on the gear shift lever and also move the latter from its neutral position into any other position relative to the change speed mechanism, depending upon the desired direction and speed at which the car is to be propelled, after which the driver releases the clutch pedal in order to permit the motion of the propelling engine to be transmitted to the driving wheels of the car in accordance with the gearing of the speed change mechanism which has been selected.

A similar operation of this control mechanism can be effected when the car is compelled to halt at a street crossing, intersection or connection in response to the requirements of a traffic signal or the orders of a traffic officer, or when necessary in case of a jam in the traffic, or to avoid an accident for one reason or another.

In all these several circumstances it is possible to stop the car quickly and also to again start the same promptly without running the propelling engine when its power for propulsion is not required, thereby permitting of effecting a substantial saving in the amount of gasoline which ordinarily is wasted when the propelling engine is permitted to operate idly while waiting for the right to proceed in accordance with the indications of the traffic signal, the orders of a traffic officer, or other requirements.

The saving of gasoline by these means is a substantial item in the case of cars which are operated in congested areas such as thickly populated cities or places where there are numerous stop or traffic signals, whereby the movement of gasoline-operated automobiles is frequently halted and thus results in a substantial waste of fuel when the engine is kept running while the car is standing still.

This improvement is very simple in construction and can be readily combined with the control mechanism of a car now in general use at small cost. Moreover, the operation of these additional features to the control mechanism of a car does not interfere with the manner in which cars have been operated heretofore, inasmuch as the same hand which operates the gear shift lever is also utilized for operating the auxiliary switch of the ignition system, and the same foot which operates the clutch pedal is utilized for operating the starting switch, thereby leaving the other hand free to operate the steering mechanism and also leaving the other foot free to work the speed accelerating mechanism or other parts which require attention.

I claim as my invention:—

In an automobile, a chassis provided with propelling means for the automobile, an internal combustion engine mounted on the chassis and provided with electric means for igniting the fuel for the engine, including a spark plug and a battery, a bodily stationary master switch mounted on the instrument board of the automobile and adapted to open and close the electric circuit containing said spark plug and battery, a change speed mechanism for transmitting motion at different speeds from said engine to the propelling means including a hand operated shift lever, an auxiliary bodily movable switch mounted on said shift lever and operable independently of the latter and adapted to open and close the circuit containing said spark plug and battery independently of said stationary master switch, a clutch mechanism for connecting and disconnecting said engine and the propelling means including a foot operated clutch pedal, an electric starting motor for operating said engine, and a starting switch for closing and opening an electric circuit containing said battery and starting motor and arranged adjacent to said clutch pedal so that the latter can be operated solely for declutching the engine independently of said starting switch, or said starting switch may be closed by the foot which operates the pedal after the declutching operation has been effected, said auxiliary switch being adapted to remain either in its open or in its closed position, excepting when manually shifted, said master switch being lockable in its open position but unlocked in its closed position, and said auxiliary switch being unlockable and always free to be shifted into either its open or closed positions independently of said lever.

MARTIN A. WEYLAND.